United States Patent
Shimakura

[11] Patent Number: 6,135,919
[45] Date of Patent: Oct. 24, 2000

[54] OIL PUMP CONTROLLER FOR AUTOMATIC TRANSMISSION

[75] Inventor: Masaki Shimakura, Kanagawa, Japan

[73] Assignee: Nissan Motor Co., Ltd., Yokoyama, Japan

[21] Appl. No.: 09/352,764

[22] Filed: Jul. 14, 1999

[30] Foreign Application Priority Data

Jul. 14, 1998 [JP] Japan .................................. 10-198928

[51] Int. Cl.[7] .................................................... F16H 9/00
[52] U.S. Cl. .......................................... 477/157; 184/27.2
[58] Field of Search ............................. 477/157; 184/27.2

[56] References Cited

U.S. PATENT DOCUMENTS

| | | | |
|---|---|---|---|
| 4,248,293 | 2/1981 | Kamezaki et al. | 417/244 X |
| 4,352,455 | 10/1982 | Moser et al. | 237/12.3 R |
| 4,381,722 | 5/1983 | Takeuchi et al. | 112/235 |
| 4,648,363 | 3/1987 | Kronich | 123/196 R |
| 4,676,336 | 6/1987 | Hiramatsu et al. | 180/233 |
| 5,147,008 | 9/1992 | Nishimore et al. | 180/140 |
| 5,222,418 | 6/1993 | Murota | 475/159 X |
| 5,547,349 | 8/1996 | Kimura et al. | 417/282 |
| 5,823,282 | 10/1998 | Yamaguchi | 180/65.2 |
| 5,915,348 | 6/1999 | Scheidt et al. | 123/90.17 |

*Primary Examiner*—Khoi Q. Ta
*Attorney, Agent, or Firm*—Foley & Lardner

[57] ABSTRACT

A first pump (21) which supplies a required flow amount for speed ratio control and a second pump (22) which supplies a flow amount which is re-cycled to an oil cooler in order to cool the oil are driven at the same time by a common motor (23). A required discharge amount for the first pump (21) is calculated depending on driving conditions and a required discharge amount for the second pump (22) is calculated depending on driving conditions. The motor (23) is controlled to a rotation speed so that a discharge amount is produced which satisfies the larger of the two required pump discharge amounts calculated above. In such a way, pump rotation speeds are controlled so that the required discharge amount is produced depending on driving conditions which enables reductions in electricity consumption and noise.

11 Claims, 9 Drawing Sheets

OIL PUMP CONTROLLER FOR AUTOMATIC TRANSMISSION

FIELD OF THE INVENTION

The present invention relates to a device controlling the rotation speed of an oil pump of a vehicle automatic transmission.

BACKGROUND OF THE INVENTION

A speed ratio control mechanism or lockup mechanism of an automatic transmission are controlled using an oil pressure (line pressure) supplied from an oil pump to the automatic transmission of a vehicle. The oil pump is driven in synchrony with the rotations of the engine. In such a device, the rotation speed of the pump is controlled with respect to a determined necessary pump discharge amount considering the characteristics of the speed ratio control mechanism and the response time to establish an oil pressure.

However the engine rotation speed undergoes large variations due to driving conditions and as a result the pump rotation speed also varies. Even at low rotation speeds such as when the engine is idling, it is necessary for the pump to be relatively large in order to maintain the necessary pump discharge amount. In particular, a continuously variable transmission requires a large pump discharge amount to lubricate the variable pulleys, the drive force transmission mechanism or the like, in addition to the required flow amount for the speed ratio control mechanism. As a result, it has been necessary to provide a pump with a large capacity to satisfy such required pump discharge amount at low engine rotation speeds.

On the other hand, at high rotation speeds, the pump discharge amount will often become excessive and unnecessary discharges will result. This has resulted in the problem that pump driving energy is wasted. To that degree, this has an adverse effect on engine fuel consumption and has also resulted in increase in pump noise.

SUMMARY OF THE INVENTION

The present invention is proposed to solve the above problems and has the object of controlling pump discharge amount to neither be in excess or less than required pump flow amount in relation to driving conditions.

The invention also has the object of reducing pump driving energy and pump noise.

To achieve above the objects the present invention provides with a pump rotation speed control device for an automatic transmission of a vehicle, the transmission controlling the operation of a speed ratio control mechanism using an oil pressure supplied from an oil pump. The control device comprises a first oil pump which supplies a required flow amount for speed ratio control of the speed ratio control mechanism, a second oil pump which supplies a flow amount for recycling to an oil cooler which cools the oil, a common motor used for simultaneously driving the first and second pumps, and a controller which controls a rotation speed of the motor. The controller is programmed to calculate a required pump discharge amount of the first pump depending on driving conditions, calculate a required pump discharge amount of the second pump depending on driving conditions, and control a rotation speed of the motor so that a pump rotation speed meets the greater of the required pump discharge amounts.

The details as well as other features and advantages of the invention are set forth in the remainder of the specification and are shown in the accompanying drawings.

DESCRIPTION OF THE PREFERRED EMBODIMENTS

The present invention adapts to a hybrid vehicle provided with an engine and an electric motor.

Figure 1:
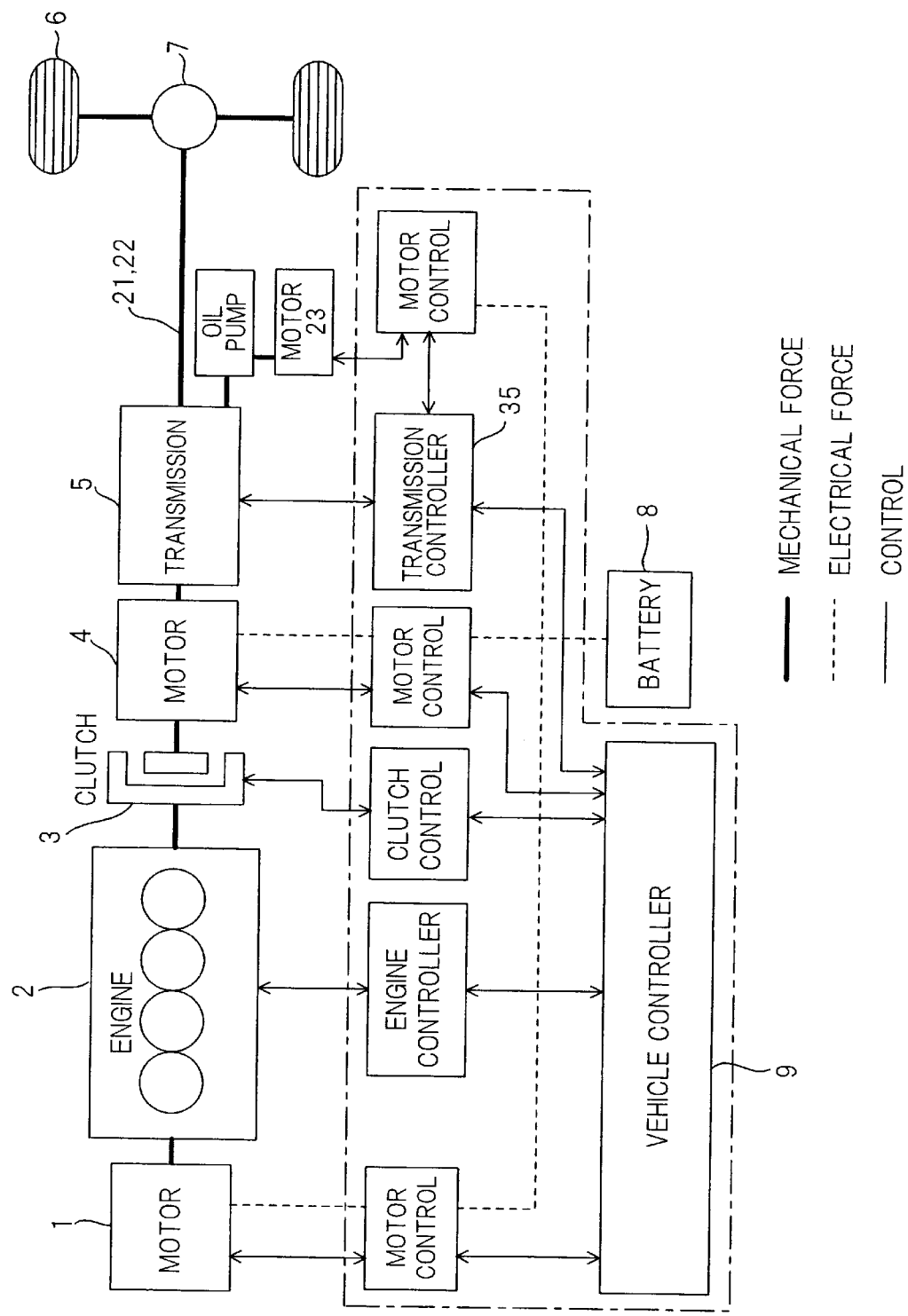
FIG. 1 is an overall block diagram of the present invention.
Figure 2:
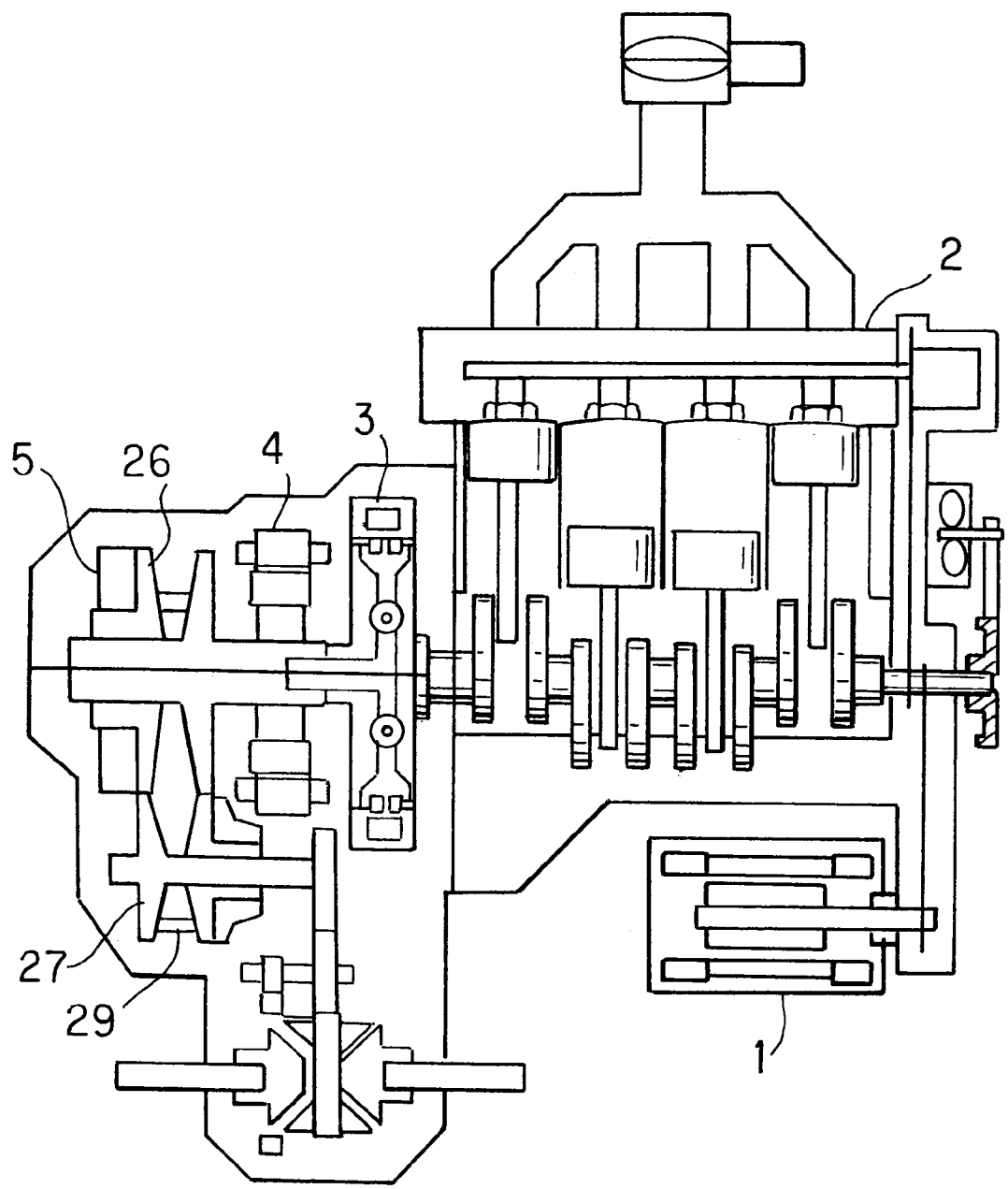
FIG. 2 is a cross sectional view of an engine and automatic transmission.

In FIG. 1 and FIG. 2, reference numeral 1 denotes a motor-generator used as a starting motor and electrical generator, 2 is an engine which drives the motor-generator 1 as an electric generator and which generates a vehicle drive force during an operation required high output 3 is a clutch which connects and disconnects the engine 2 and a motor-generator 4. Thus the motor-generator 4 is used as a motor in order to generate a vehicle drive force during vehicle start or low load operation. During a braking operation the motor-generator 4 is used to generate electricity by performing so-called regenerative braking by which vehicle running energy is transformed into electricity.

5 is an automatic transmission which varies the rotation speed from the motor-generator 4 and the engine 2 or from the engine 2 alone on the basis of driving conditions. The varied rotation speeds are transmitted to a drive wheels 6 through a differential gear (drive force transmission mechanism) 7.

The motor-generators 1, 4 or a motor 23 (to be discussed below) are connected to a battery 8 through an inverter or similar mechanism.

A controller 9 is provided which controls the engine or the motor-generator. The controller 9 controls the motor-generators 1, 4 to function as a motor or an electrical generator and controls the output of the engine 2 on the basis of driving conditions. Furthermore the controller 9 controls the engagement of the clutch 3 and the speed ratio of the automatic transmission 5.

In this way, the clutch 3 is disengaged when the vehicle is starting or at low rotation speeds and the vehicle is driven only by the motor-generator 4 through the automatic transmission 5. When the vehicle requires a large output, the clutch 3 is engaged and the vehicle is driven by the output of both the motor-generator 4 and the engine 2 or alternatively only by the engine 2.

When the vehicle is driven only by motor-generator 4, the motor-generator 1 functions as an electrical generator as required and the engine 2 drives the motor-generator 1 to generate electricity. During the braking operation for example, the clutch 3 is disengaged and electricity is generated by the motor-generator 4 being driven by the inertia of the vehicle and performing regenerative braking as explained above.

The present invention is related to a controller of the rotation speed of oil pumps 21, 22 which supply a required oil pressure to the automatic transmission (continuously variable transmission) 5.

Figure 3:
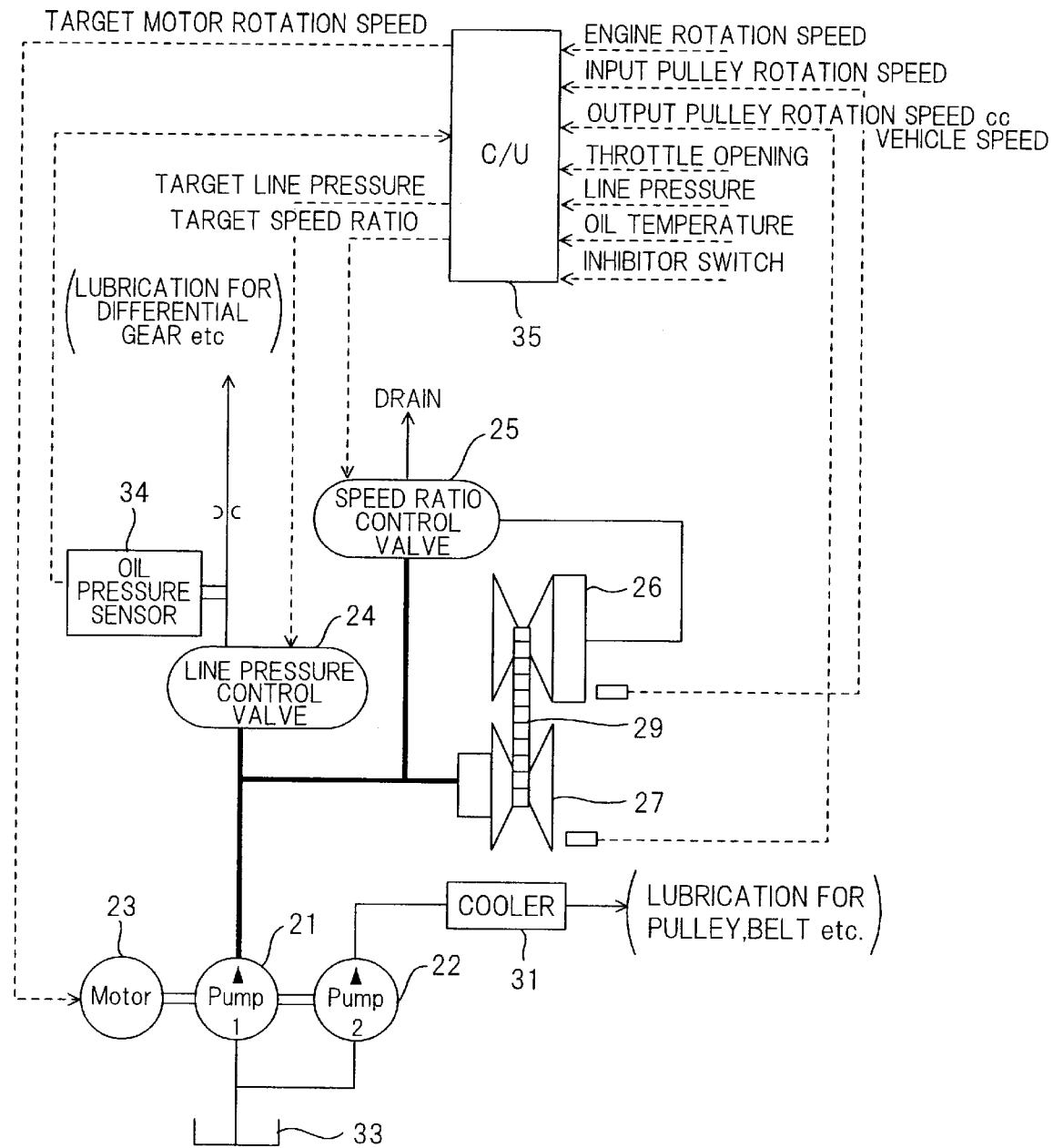
FIG. 3 is a block diagram containing an oil pressure passage.

As shown in FIG. 3, two oil pumps 21, 22 are provided which are connected to each oil pressure line. These pumps are disposed in mutually co-axial positions and are driven at the same time by the common motor 23.

The discharge oil from the first oil pump 21 is regulated by a line pressure control valve 24 and is supplied to a hydraulic piston on a primary pulley 27 on the input side of the variable mechanism through a speed ratio control valve 25. After an amount of oil is regulated by the line pressure control valve 24, it is supplied to a hydraulic piston on the output side of a secondary pulley 28 or to the drive force transmission mechanism discussed above.

The primary and secondary pulleys 26, 27 which comprise the variable mechanism are connected by a belt 29. A pulley groove width which depends on a variable oil pressure applied by a hydraulic piston of the primary pulley 26 is varied and thus a speed ratio is varied by the continuous variation of the pulley ratio. The area to which pressure is applied of the secondary hydraulic piston is made smaller than the area to which pressure is applied of the primary hydraulic piston so that the secondary pulley 27 varies the pulley groove width in response to the primary pulley 26.

The discharge oil of the second oil pump 22 is supplied as lubrication of the belt 29 above and similar components through an oil cooler 31 which cools the oil.

Since the belt 29 is strongly gripped between the pulleys 26, 27, the temperature can easily rise due to friction. In particular at high rotation speeds or at high load, a relative large pump discharge amount is required for cooling and lubrication.

The discharge oil of the first and second oil pumps 21, 22 is returned and mixed in a same reservoir 33. Therefore in spite of the fact that only the discharge oil from one oil pump 22 passes through the oil 6 cooler 31, it is possible to cool all the oil.

The discharge amounts supplied from the oil pumps 21, 22, as described below, are determined based on the required flow amounts of each oil pressure line. A controller 35 controls the rotation speed of the pumps 21, 22, that is to say, the rotation speed of the motor 23 to supply the greater of the required discharge amounts.

The two oil pumps 21, 22 are driven at the same rotation speed by the motor 23 and the rotation speed of the motor is controlled so that the oil discharge amount definitely meets the greater of the required amounts of the two pumps 21, 22.

To meet these required flow amounts, various detection signals representing driving conditions (engine rotation speed, input pulley rotation speed, output pulley rotation speed, throttle opening, line pressure, oil temperature, inhibitor switch and the like) are input into the controller 35. In addition, a lubrication pressure from the pressure sensor 34 is input. On the basis of these signals, a target line pressure and a target speed ratio is calculated depending on driving conditions. The required pump discharged amounts of the first and second oil pumps 21, 22 are calculated and a corresponding required pump rotation speed to maintain the greater of these pump output amounts is calculated. The rotation speed of the motor 23 is controlled on this basis.

Now control of the rotation speed of the oil pump (motor) will be described on the basis of the flowcharts in FIGS. 4 to 10.

Figure 4:
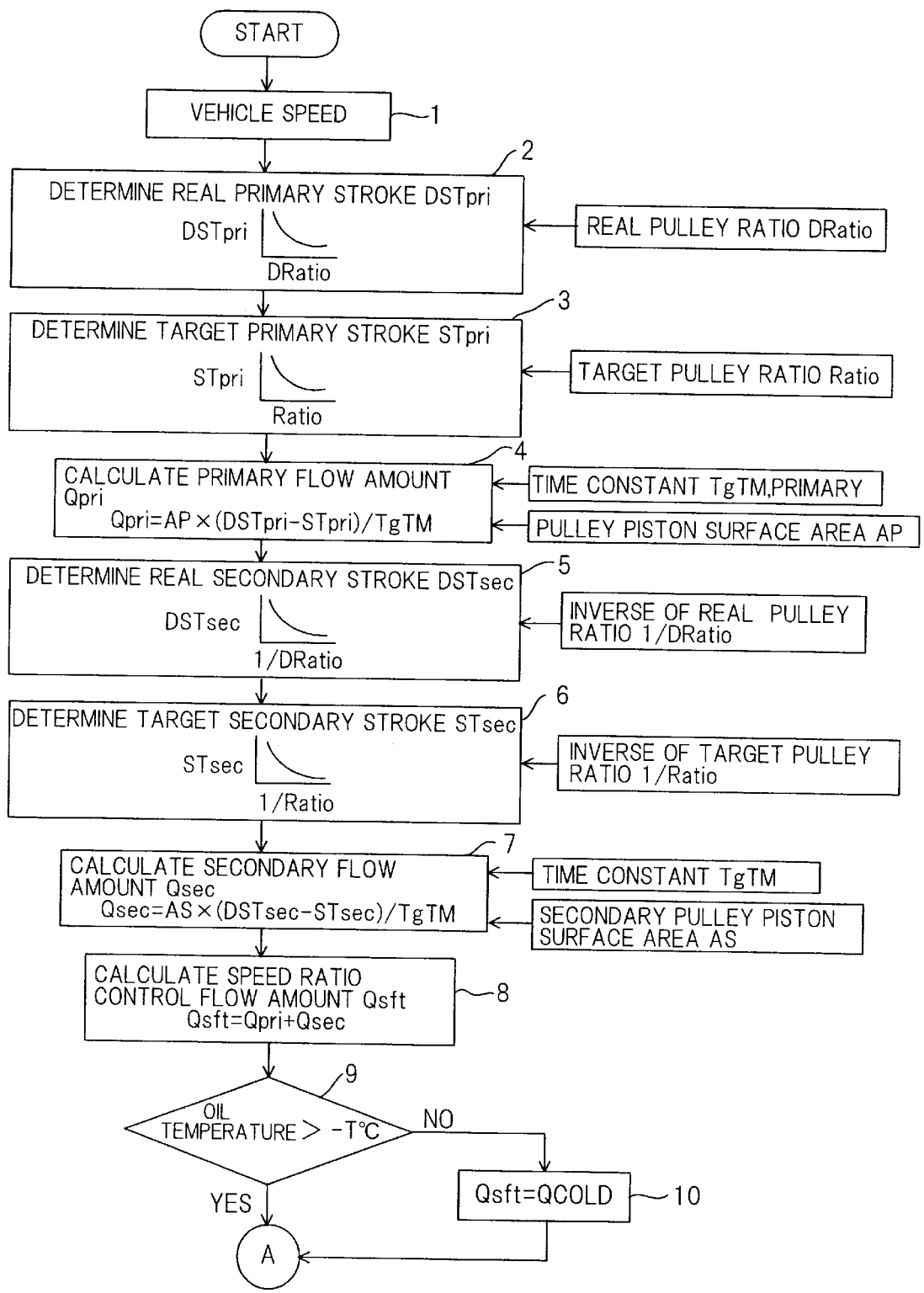
FIG. 4 is a flowchart showing control of a pump rotation speed.

FIG. 4 shows the calculation routine of a required pump rotation speed N1 (required pump output) for the first oil pump.

In a step S1, a target speed ratio is determined from the driving conditions at that time. On the basis of this speed ratio, in steps S2–S7, a required pump discharge amount to drive each hydraulic piston in order to vary the pulley groove width of the primary and secondary pulleys is calculated.

A hydraulic piston stroke is calculated from the pulley ratio to realize a target speed ratio and a corresponding required pump flow amount is calculated. In the step S2, firstly a current primary piston stroke DSTpri is calculated from the map shown in the figure based on the real pulley ratio DRatio.

In the same way, in a step S3, a current target primary piston stroke STpri is calculated from the map shown in the figure based on the pulley ratio Ratio when the target speed ratio is realized.

The flow amount to the primary piston is proportional to the difference between the real and the target piston strokes. In a step S4, the primary flow amount is calculated based on the cross sectional area of the piston and a stroke difference. When the cross sectional area of the primary piston is taken to be AP, the required flow amount Qpri becomes Qpri=AP (DSTpri−STpri)/TgTM from the stoke difference. Herein TgTM is a time constant.

In order to calculate a secondary flow amount, a real piston stroke DSTsec for the secondary pulley is calculated in a step S5 referring to the map on the basis of the inverse of the primary real pulley ratio, that is to say, from 1/DRatio in order to calculate a secondary flow amount. This is because the stroke of the primary and secondary pulley pistons displace in opposite directions.

As it is possible to use the map used in the step S2 as the same map to calculate the piston stroke from the pulley ratio, the number of maps is reduced and thus data capacity can be reduced.

In the same way in a step S6, a target secondary cylinder stroke STsec is calculated from the map using the inverse 1/Ratio of the target pulley ratio. In a step S7, a secondary flow amount Qsec is calculated as Qsec=AS(DSTsec−STsec)lTgTM from the cross sectional area AS of the secondary piston and the stroke difference.

When the primary and secondary flow amounts are calculated in this way and added to the required flow amount for speed ratio control calculated in a step S8, the total value becomes a speed ratio control flow amount Qsft=Qpri+Qsec.

For example when the primary flow amount is increased, the secondary flow amount is reduced.

Step S9 entails a correction for adjusting deficiencies in the speed ratio control flow amount at low temperatures. In the step S9, it is determined whether an oil temperature is above −T° C. or not. If the oil temperature is below −T° C., Qsft=QCOLD is set as the speed ratio control flow amount Qsft. In the above way, it is possible to increase pump discharge amount at low temperatures and to improve low temperature performance.

The flowchart in FIG. 5 will be described below.

A pump leakage flow amount is calculated from an oil line pressure in a step S11. The leakage flow amount Qle is calculated on the basis of the map shown in the figure from the pump control line pressure PmpPl and oil temperature TempSEN.

The conventional calculation of a leakage flow amount is performed on the basis of oil temperature and line pressure of the worst value during the worst conditions and consequently a considerable margin results. However in the present invention, it is possible to accurately estimate a leakage flow amount by calculating from the map using line pressure and oil temperature as parameters. Thus it is possible to reduce unnecessary discharge amounts from the oil pump.

A lubrication flow amount (differential lubrication amount) for the drive force transmission mechanism is calculated as Qlub in a step S12. This value is calculated from the map on the basis of oil temperature TempSEN.

As the conventional calculation of a lubrication flow amount is based on the worst value in oil temperature conditions, a considerable margin unavoidably results. In contrast, an accurate differential lubrication flow amount can be estimated from the map in relation to oil temperatures and excess oil discharges can be greatly reduced.

A necessary pump discharge amount Qpmp1 for the first oil pump is calculated as a total value of each flow amount in a step S13. That is to say, the necessary pump discharge amount becomes Qpmp1=Qsft+Qle+Qlub.

Next on the basis of the above value, a first oil pump rotation speed is calculated to achieve the required pump discharge amount after a step S14.

The pump rotation speed is calculated from the relationship of the pump volume efficiency and the pump fixed discharge amount. First in a step S14, a first pump efficiency coefficient k1 is calculated from the map based on an oil temperature TempSEN.

In a step S15, a pump volume efficiency ITAv1 is calculated in the following manner from the pump efficiency coefficient k1 and the pump control line pressure PmpPL. That is to say, it is calculated as ITAv1=1−k1×PmpPL.

If the pump volume efficiency is calculated only on a single occasion, it is necessary for it to be calculated from a three dimensional map based on oil temperature and pressure since the pump volume efficiency varies due to oil temperature and pressure conditions. However the data capacity of a three dimensional map is large and this increases the size of the controller as a result. The present invention uses the coefficient k1 calculated from respectively pre-stored volume efficiency data at respective temperatures and pressures. The coefficient k1 is calculated depending on oil temperature at that time from a two dimensional map established from the relationship of the coefficient to oil temperature. Thus pump volume efficiency is calculated as volume efficency=1−coefficient×pressure.

The use of a two dimensional map is enabled by such an arrangement and it is possible to estimate a pump volume efficiency accurately with a lower data capacity. In a step S16, a control amount of the pump rotation speed MotCREV1 is calculated as set out below based on the above values.

MotCREV1=Qpmpl/DPMP/ITAv1

Herein DPMP is a fixed discharge amount(per unit rotation) of the first oil pump.

The required pump rotation speed calculated as set out above varies constantly on the basis of the current required pump discharge amount, oil temperature and line pressure. When the rotation speed is controlled to synchronize with the engine as in the conventional example, an excess oil discharge with respect to existing driving conditions is sometimes supplied. However in the present invention, the pump discharge amounts are normally controlled to the minimum required.

In a step S17, it is determined whether or not rapid speed ratio control is required. When rapid speed ratio control is required for example during kick down acceleration, the routine proceeds to a step S18 and the pump rotation speed is corrected. That is to say, a correcting rotation speed SSUCOMP is added to the pump rotation speed MotCREV1. The pump discharge amount is increased and responsive time to rapid speed ratio control is maintained.

Figure 6:
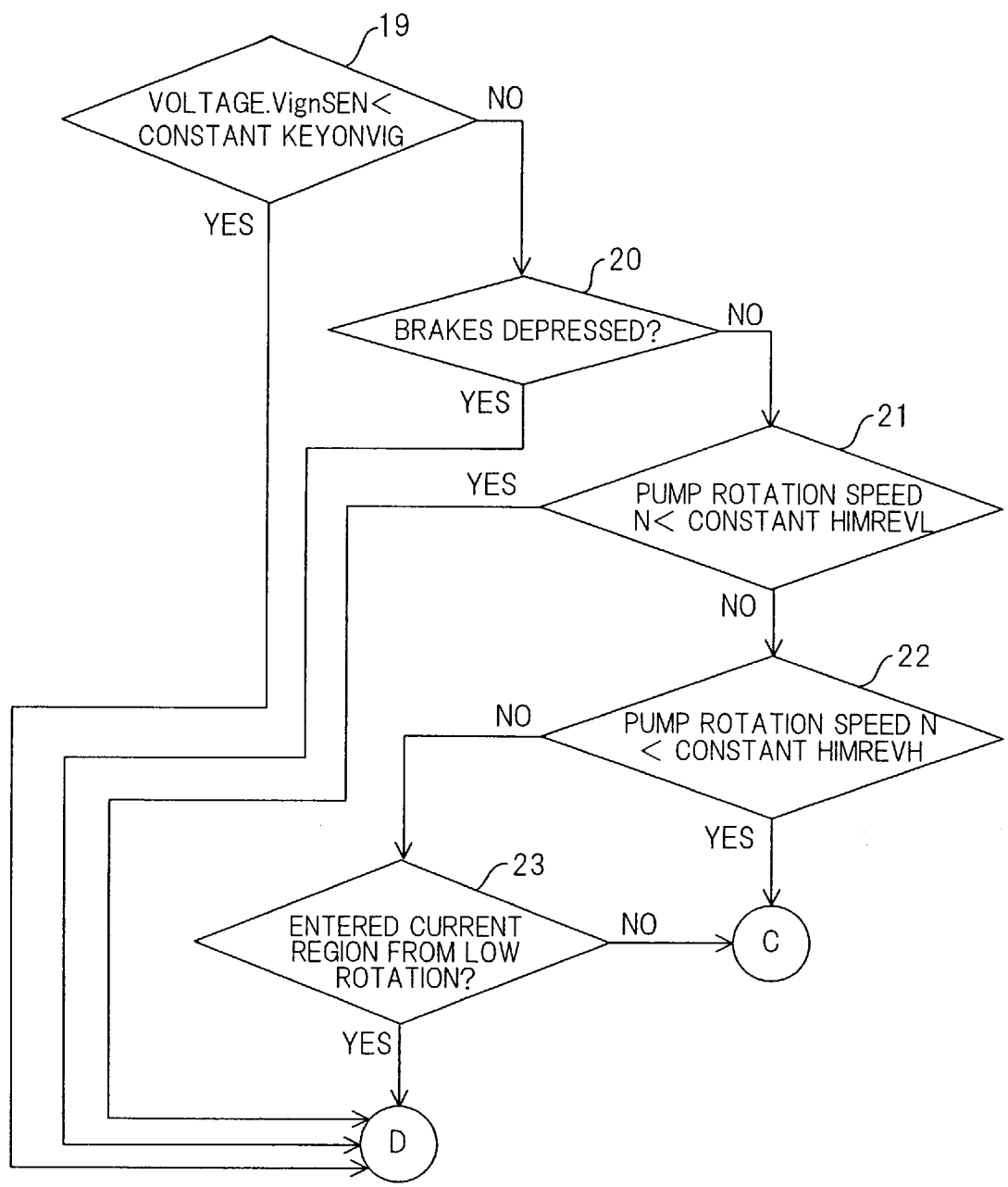
FIG. 6 is a flowchart showing control of a pump rotation speed.

Next with reference to the flowchart as shown in FIG. 6, it is determined whether or not pressure feedback control of the lubrication flow amount which is supplied by the first oil pump is performed.

In a step S19, a battery voltage VignSEN is compared with a constant KEYONVIG which is a limiting value, and control is terminated to terminate when below a fixed value. In contrast, when above a fixed value, in a step S20 it is determined for example whether or not a brake is being depressed from examining a output of a brake switch.

When the brake is depressed, feedback control is terminated as above. When the brake is not being depressed, the routine progresses to a step S21, and it is determined whether or not the pump rotation speed N is below a lower limit HIMREVL. When below the lower limit, the routine is terminated. When above the lower limit, in a step S22, it is determined whether the pump rotation speed is above an upper limiting value HIMREVH or not. If above, the routine proceeds to the feedback control routine shown in FIG. 7 which is described below.

When the above is not the case, in a step S23, it is determined whether the present operating region has been entered from the low rotation side. When this is not the case, the routine proceeds in the same way to feedback control. If the present operating region has been entered, control is terminated.

The upper and lower limits of the pump rotation speed above are set to prevent hunting which is generated during feedback control.

Figure 7:
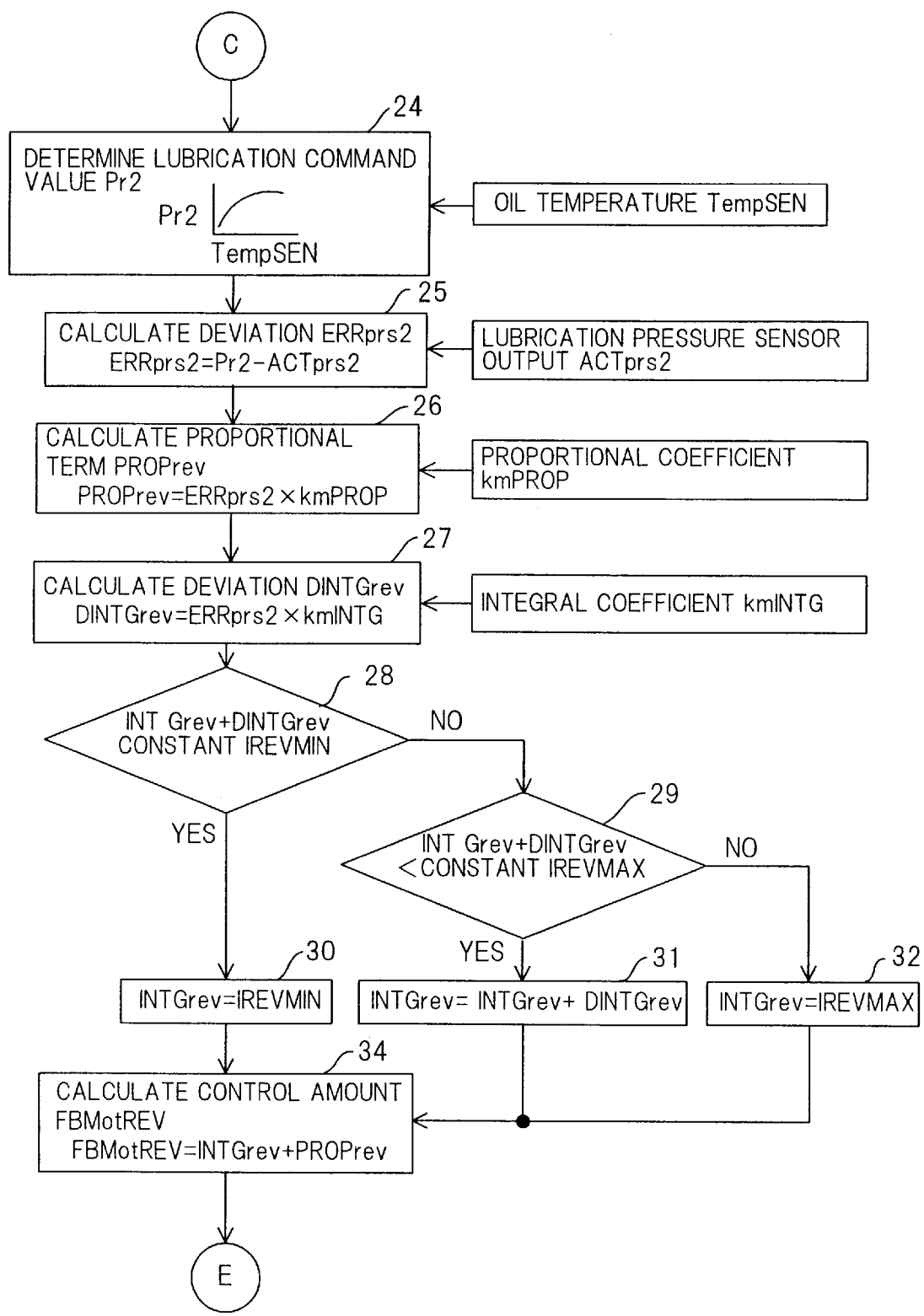
FIG. 7 is a flowchart showing control of a pump rotation speed.

FIG. 7 is a flowchart of pressure feedback control of the lubrication flow amount.

Firstly, in a step S24, a command value Pr2 for lubrication oil pressure is calculated with reference to a map such as that shown in the figure based on the current oil temperature TempSEN.

Then in a step S25, an output ACTprs2 of the lubrication oil pressure sensor 34 is read and a deviation ERRprs2 of this value and the command value above is calculated. In a step S26, a proportional term PROPrev for proportional integral control is calculated as PROPrev=ERRprs2× kmPROP based on the deviation above and read proportional coefficient kmPROP.

In a step S27, a difference DINTGrev is calculated from the deviation ERRprs2 and integral coefficient kmINTG.

DINTGrev=ERRprs2×kmINTG

Next in a step S28, the sum (DINTGrev+INTGrev) of the integral term INTGrev and the difference DINTGrev is compared with a lower limiting constant IREMIN. When the sum is smaller than IREMIN, the routine proceeds to a step S30 where the integral term INTGrev is made equal to IREMIN.

On the other hand, when the sum is larger than the lower limiting constant, the routine proceeds to a step S29 and the sum above is compared with an upper limiting constant IREMAX. When the sum above is smaller than IREMAX, the routine proceeds to a step S31 and integral term INTGrev is made equal to INTGrev+DINTGrev.

When the sum is larger than the constant of the condition, the routine proceeds to a step S32 and INTGrev is made equal to IREMAX.

In a step S34, a feedback control amount FBMotREV which is added to the control amount of the pump rotation speed as outlined above is calculated in the manner outlined below.

$$FBMotREV = INTGrev + PROPrev$$

Figure 8:
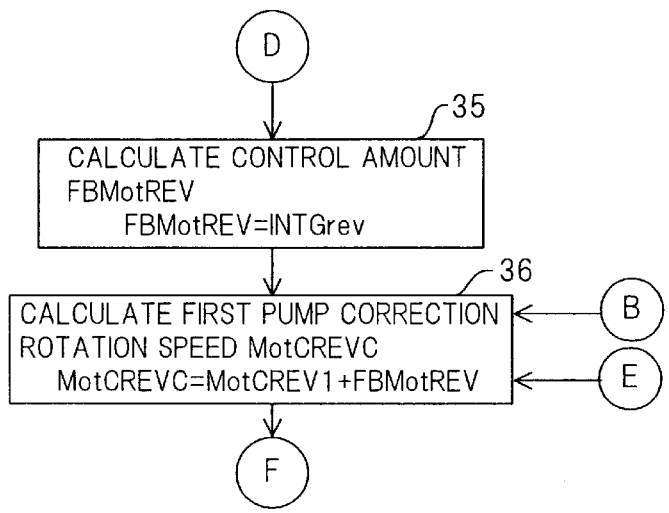
FIG. 8 is a flowchart showing control of a pump rotation speed.

FIG. 8 shows the calculation routine of a correction amount for the pump rotation speed based on the above values.

In a step S35, a control amount FBMotREV at D when feedback control is terminated in FIG. 6 is calculated as FBMotREV=INTGrev.

Figure 5:
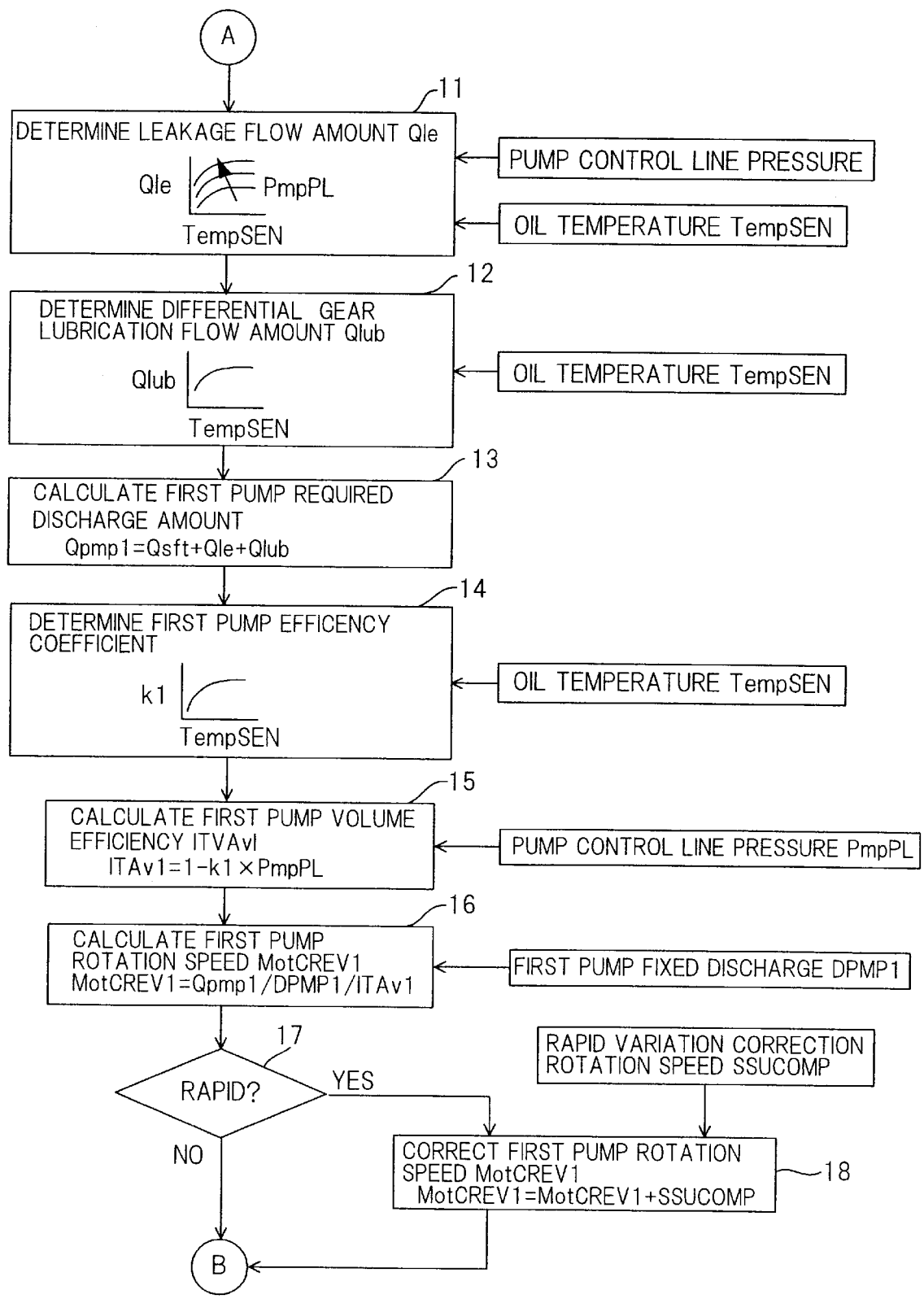
FIG. 5 is a flowchart showing control of a pump rotation speed.

A pump rotation speed correction amount MotCREVC is calculated from MotCREVC=MotCREVC1+FBMotREV based on the rotation speed of the pump at B in FIG. 5 or rotation speed at E in FIG. 7.

Therefore the correction rotation speed becomes a first oil pump rotation speed N1 (required pump discharge amount) which takes into account the feedback control amount and the like.

In the conventional example, a margin is necessary due to a pump size determined from a necessary pump discharge amount after deterioration of components over time. However with the feedback control of the present invention, unnecessary amounts of supplied oil are reduced, the pump size may be reduced and overall fuel efficiency is greatly enhanced. In addition, even with component deterioration over time, sufficient lubrication may be maintained.

Figure 9:
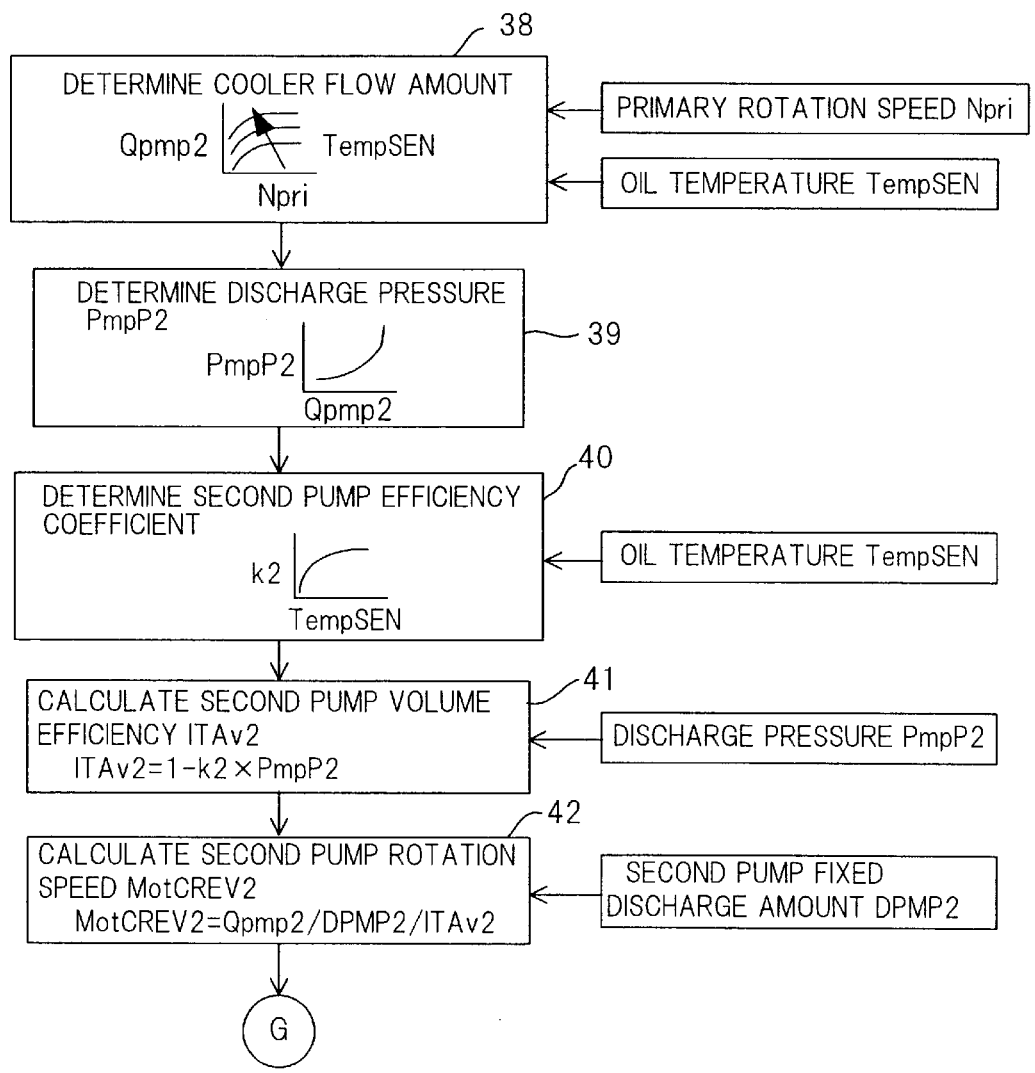
FIG. 9 is a flowchart showing control of a pump rotation speed.

FIG. 9 is a flowchart showing the calculation of a second oil pump rotation speed N2 (required pump discharge amount).

Although a fixed flow of oil passes through the oil cooler, since lubrication of the pulleys or belt of the continuously variable transmission is also performed by oil after passing through the oil cooler, an output value which satisfies this latter requirement is also required.

As a result, in a step S38, a required oil cooler flow amount Qpmp2 (that is to say, second pump output) is estimated based on a map as shown in the figure from the current primary rotation speed Npri and the oil temperature TempSEN.

In the conventional example, the oil cooler flow amount is normally set on the basis of the worst condition with respect to vehicle speed conditions or oil temperature. Thus a considerable margin must be required and therefore depending on driving conditions, excess oil flow amount results. Since the present invention on the other hand calculates on the basis of the current oil temperature and the primary rotation number, normally a required amount is achieved and excess discharges are avoided.

In a step S39, a pump discharge pressure PmpP2 is calculated from the map as shown in the figure based on the cooler output Qpmp2.

On this point, the conventional example determines the pressure of the cooler system by estimating a maximum cooler flow amount. Therefore naturally the pump discharge pressure increases. Therefore in this regard also, a considerable margin results. To the contrary, the present invention estimates a pressure of the cooler system accurately using the map of pump pressures PmpP2 related to the cooler flow amount Qpmp2 determined in the step S38. Thus it is possible to reduce unnecessary discharges from the pump.

Next in a step S40, a second oil pump efficiency coefficient k2 is calculated from a map based on the current oil temperature TempSEN. In a step S41, a pump volume efficiency ITAv2 is calculated as ITAv2=1−k2×PmpP2 based on TempSEN and the pump discharge pressure.

In a step S42, a pump rotation speed MotCREV2 is calculated as shown below.

$$MotCREV2 = Qpmp2/DPMP2/ITAv2$$

DPMP2 is a fixed discharge amount (pre unit rotation) of the second oil pump.

The calculation of the pump required rotation speed (pump discharge amount) is performed to use in the same manner as the calculation of the pump rotation speed or the volume efficiency of the first pump in the steps S14–16 as shown in FIG. 5. In this way, the rotation speed can be accurately set and to that degree unnecessary oil discharges are reduced.

Figure 10:
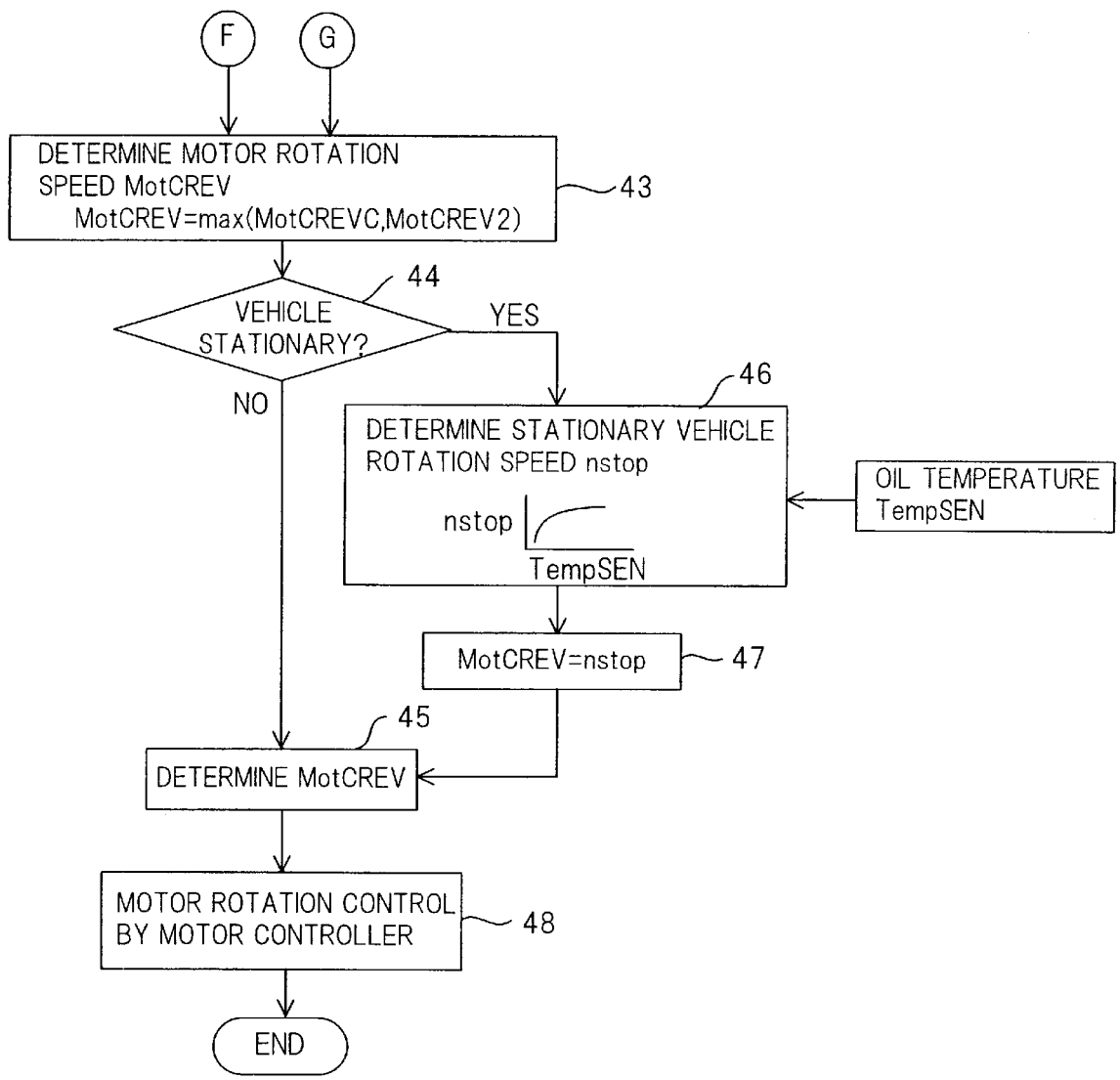
FIG. 10 is a flowchart showing control of a pump rotation speed.

FIG. 10 shows the process of selecting the greater of the pump rotation speeds based on the required pump rotation speeds, that is to say, the first oil pump rotation speed and the second oil pump rotation speed. A required motor rotation speed corresponding to the selected rotation speed is then determined.

In a step S43, the greater rotation speed of the first and second required oil pump (motor) rotations speeds MotCREVC and MotCREV2 is determined as a motor rotation speed MotCREV to rotate the two connected pumps.

Steps S44–S47 comprise control for reducing unnecessary pump discharges by reducing the pump rotation speed when the vehicle is stationary with the brake depressed. In the step S44, it is determined whether the vehicle is stationary.

If the vehicle is stationary, the routine proceeds to a step S46 and a stationary vehicle pump rotation speed nstop is calculated from the map based on the current oil temperature TempSEN. In a step S47, this is set as a motor rotation speed MotCREV. The rotation speed nstop is lower than any rotation speed during normal control and is set to a rotation speed at which a pump discharge pressure will maintain a required pressure during the next speed ratio control.

If the vehicle is not stationary, in a step S45, the greater of the two values MotCREVC and MotCREV2 is set as a normal rotation speed MotCREV. Thereafter if the vehicle is stationary as above, nstop is set as MotCREV.

The required values of the respective pump rotation speeds are input into the controller and in the step S48, the rotation speed of the motor is controlled so that the required rotation speed is achieved.

The overall operation of above arrangement will now be described.

The first and second oil pumps 21 and 22 are driven by a common motor 23 and rotate in synchrony. Thus the discharge amounts of the pumps depends on the rotation speed of the motor.

The discharge amount from the first oil pump 21 is regulated by the line pressure control valve 24 and is supplied directly to the hydraulic piston of the secondary pulley 27 and to the primary pulley 26 of the continuously variable transmission through the variable control valve 25. It is supplied as a lubricating oil for lubricating the drive force transmission mechanism and thereafter returns to the reservoir 33.

The discharge amount from the second oil pump 22 re-circulates to the reservoir 33 after being supplied as a lubricating oil to the pulley or the belt 29 through the oil cooler 31.

The required flow amount of both these oil pressure lines differs on the basis of driving conditions. As a result, required discharge amount of the first oil pump 21 and the required discharge amount of the second oil pump 22 is calculated based on the current speed ratio, line pressure, oil temperature and the like.

The two required pump discharge amounts are compared and a pump rotation speed that is to say, a motor rotation speed is determined which satisfies the required supply for the greater of the two.

Thus the result of controlling the pump rotation speed so that a required pump discharge amount is supplied depending on current conditions, required cooling performance, lubrication performance and variable performance of the automatic transmission is sufficiently maintained. On the other hand, unnecessary pump discharges are avoided and it is possible to reduce electricity consumption of the motor used to drive the pump and reduce noise associated with driving the pump.

Furthermore since the greater of the two values is selected, even if the required pump discharge amount of the first and second pumps is reversed, a required flow amount can be supplied normally will high accuracy.

The calculation of the required pump discharge amount for speed ratio control, that is to say, the pump discharge amount to operate the primary and secondary hydraulic pistons entails the determination of a pulley ratio of the primary and secondary pulleys 26, 27. The primary piston stroke is calculated from the map on the basis of the pulley ratio (that is to say, equal to the drive ratio) and the secondary piston stroke is determined from the inverse of the speed ratio. As a result, the map set on the relationship of speed ratio and stroke which is required to calculate the speed ratio control flow amount can be used for both the calculation of the primary and the secondary. Therefore the size of the controller may be reduced due to the reduction in the amount of the data in the controller.

When the oil leakage amount from the oil pressure line, the lubrication amount of the drive force transmission mechanism or the oil cooler recirculation amount is calculated, a setting such as in the conventional example which achieves a sufficient margin in the discharge amount based on the worst conditions of pressure and oil temperature (for example during idling) inevitably entails a large increase in unnecessary discharges due to driving conditions. However it is possible to set an output which is normally neither greater nor less than that required by calculating required pump discharge amounts from a map based on a current oil temperature or pressure. As a result, excess flow amount is avoided and to that degree, electricity consumption of the motor is reduced and fuel consumption is improved.

In setting the pump rotation speed in order to supply a required pump discharge amount, the pump volume efficiency may use a coefficient calculated from volume efficiency data measured based on preset oil temperatures and pressures. The coefficient is calculated depending on a current oil temperature from a two dimensional map set from the relationship of the coefficient and oil temperature. Since volume efficiency is calculated from this value and a pump discharge pressure, it is possible to reduce the data capacity of the controller in comparison with the conventional example in which a three dimensional map which defines pump volume efficiency directly by the relationship of pressure and oil temperature. The present invention is not limited to applications on hybrid vehicles and naturally may be adapted for use in the control of an oil pump of an automatic transmission of a vehicle which runs normally by an engine.

The present invention is not limited to belt-type continuously variable transmissions as an automatic transmission and may of course be adapted to toroidal continuously variable transmissions or to normal geared transmissions.

The entire contents of Japanese Patent Application P10-198928(filed Jul. 14, 1998) is incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An oil pump rotation speed control device for an automatic transmission of a vehicle, said transmission controlling the operation of a speed ratio control mechanism using oil pressure supplied from an oil pump, wherein said control device comprises:

a first oil pump which supplies a required flow amount for speed ratio control of said speed ratio control mechanism;

a second oil pump which supplies a flow amount for recycling to an oil cooler which cools said oil;

a motor used for simultaneously driving said first and second pumps; and a controller which controls a rotation speed of said motor, said controller programmed to calculate a required pump discharge amount of said first pump depending on driving conditions;

calculate a required pump discharge amount of said second pump depending on driving conditions; and control a rotation speed of said motor so that a pump rotation speed meets the greater of said required pump discharge amounts.

2. An oil pump rotation speed control device for an automatic transmission according to claim 1, wherein said first pump supplies a required flow amount for lubrication of a drive force transmission mechanism and a flow amount which corresponds to a leakage amount in addition to a flow amount for speed ratio control; and said second pump supplies a required flow amount for lubrication of said speed ratio control mechanism and a re-cycled flow amount to the oil cooler.

3. An oil pump rotation speed control device for an automatic transmission according to claim 1, wherein said controller is further programmed to calculate a pump coefficient from a coefficient calculated from pump volume efficiency data measured based on pre-stored oil temperatures and pressures and from an oil temperature;

calculate a pump volume efficiency from said pump coefficient and pressure; and calculate a required pump rotation speed used as a required pump discharge amount based on the calculated volume efficiency.

4. An oil pump rotation speed control device for an automatic transmission according to claim 2, wherein said control device further comprises a pressure sensor which detects a pressure of lubrication oil supplied to the drive force transmission mechanism; and said controller is further programmed to feedback control a pump rotation speed so that said lubrication oil pressure detected by said pressure sensor equals a target value when the calculated first pump rotation speed is above a pre-stored upper limit for said first pump.

5. An oil pump rotation speed control device for an automatic transmission according to claim 4, wherein said control device further comprises a sensor which detects an operation of brakes and a sensor which detects a battery voltage; and said controller is further programmed to terminate feedback control of said pump rotation speed when a battery voltage is below a predetermined value or the brakes are operated.

6. An oil pump rotation speed control device for an automatic transmission according to claim 2, wherein said controller is further programmed to calculate a lubrication flow amount for the drive force transmission mechanism from a flow amount map set based on a relation with oil temperature.

7. An oil pump rotation speed control device for an automatic transmission according to claim 1, wherein said speed ratio control mechanism comprises a belt-type continuously variable mechanism having a primary and a secondary pulley and a belt looped around these pulleys, and said controller is further programmed to calculate a piston stroke for said primary pulley from a target speed ratio;

calculate a piston stroke for said secondary pulley from an inverse of said target speed ratio; and calculate a required pump discharge amount for speed ratio control based on these piston strokes.

8. An oil pump rotation speed control device for an automatic transmission according to claim 7, wherein said controller is further programmed to calculate the re-cycled flow amount to said oil cooler from a map with respect to a relation with oil temperature and said pump rotation speed.

9. An oil pump rotation speed control device for an automatic transmission according to claim 1, wherein said controller is further programmed to correct a required speed ratio control flow amount of said first pump so that the pump discharge amount during rapid acceleration is increased more than a normal speed ratio control flow amount.

10. An oil pump rotation speed control device for an automatic transmission according to claim 1, wherein said controller is further programmed to correct a required speed ratio control flow amount of said first pump so that the pump discharge amount when oil temperature is lower than a predetermined value is increased more than a normal speed ratio control flow amount.

11. An automatic transmission of a vehicle, said transmission including an oil pump speed control device and controlling the operation of a speed ratio control mechanism using oil pressure supplied from an oil pump, wherein said control device comprises:

a first oil pump which supplies a required flow amount for speed ratio control of said speed ratio control mechanism;

a second oil pump which supplies a flow amount for recycling to an oil cooler which cools said oil;

a motor used for simultaneously driving said first and second pumps; and a controller which controls a rotation speed of said motor, said controller programmed to calculate a required pump discharge amount of said first pump depending on driving conditions, calculate a required pump discharge amount of said second pump depending on driving conditions and control a rotation speed of said motor so that a pump rotation speed meets the greater of said required pump discharge amounts.

* * * * *